(12) United States Patent
Sakamoto et al.

(10) Patent No.: US 7,001,548 B2
(45) Date of Patent: Feb. 21, 2006

(54) METHOD FOR MANUFACTURE OF POROUS PRODUCT FROM MOLDED HIGH INTERNAL PHASE EMULSION

(75) Inventors: Katsuhiko Sakamoto, Izumisano (JP); Masazumi Sasabe, Kakogawa (JP)

(73) Assignee: Nippon Shokubai Co., Ltd., Osaka (JP)

( * ) Notice: Subject to any disclaimer, the term of this patent is extended or adjusted under 35 U.S.C. 154(b) by 215 days.

(21) Appl. No.: 10/466,345

(22) PCT Filed: May 24, 2002

(86) PCT No.: PCT/JP02/05052

§ 371 (c)(1), (2), (4) Date: Jul. 15, 2003

(87) PCT Pub. No.: WO02/096614

PCT Pub. Date: Dec. 5, 2002

(65) Prior Publication Data

US 2004/0061251 A1    Apr. 1, 2004

(30) Foreign Application Priority Data

May 29, 2001 (JP) ............................... 2001-160441

(51) Int. Cl.
*B29C 44/02* (2006.01)

(52) U.S. Cl. ..................................... 264/41; 264/297.1

(58) Field of Classification Search ................... 264/41, 264/46.1, 46.2, 46.4, 297.1; 425/335; 521/64
See application file for complete search history.

(56) References Cited

U.S. PATENT DOCUMENTS

| 5,334,621 A | 8/1994 | Beshouri .................... 521/64 |
| 6,406,648 B1 * | 6/2002 | Noel et al. ................. 264/46.4 |

FOREIGN PATENT DOCUMENTS

| JP | 10-217264 | 8/1998 |
| WO | WO 00/50498 | 8/2000 |
| WO | WO 01/32227 A1 | 5/2001 |

* cited by examiner

Primary Examiner—Leo B. Tentoni
(74) Attorney, Agent, or Firm—Fish & Richardson P.C.

(57) ABSTRACT

A method directed to manufacturing porous products by supplying a water-in-oil type high internal phase emulsion into mold elements, shaping and polymerizing the emulsion. It is characterized by a moving shaping unit provided with a lower mold element on one side having a smooth mold face furnished with a depressed part and an upper mold element on the other side having a smooth mold face furnished with a corresponding depressed part forming a cavity of a stereoscopic shape together with the depressed part of the lower mold element. Prior to the union of the two mold elements continuously supplying the emulsion into the two mold elements, transferring the shaping unit into a polymerizing device subsequent to the union of the mold elements, and shaping and polymerizing the emulsion therein.

9 Claims, 5 Drawing Sheets

METHOD FOR MANUFACTURE OF POROUS PRODUCT FROM MOLDED HIGH INTERNAL PHASE EMULSION

TECHNICAL FIELD

This invention relates to a method for the manufacture of a porous product by the shaping of a water-in-oil type high internal phase emulsion (hereinafter referred to as "HIPE") and more particularly to a method for efficiently manufacturing an open-cell type porous product excelling in water absorption properties by supplying the HIPE into a mold and then continuously polymerizing it therein.

BACKGROUND ART

As a technique for obtaining a porous material formed of continuous open cells having a fine and uniform diameter, which comprises forming an HIPE in the presence of a specific surfactant and then obtaining a polymer of the HIPE has been known. The term "HIPE" as used herein is generally known as an emulsion of such a quality that the dispersed phase thereof is exceeding 70 vol. % of the whole volume of the emulsion. The official gazette of U.S. Pat. No. 5,334,621, for example, discloses a method for producing a porous material by the HIPE, which method is subjected a polymerizing monomer contained in such an HIPE to cross-linking polymerization.

The HIPE method produces a porous material by preparing an HIPE comprising (i) a polymerizing monomer mixture containing an oil-soluble vinyl monomer and a cross-linking monomer possessing not less than two functional groups in the molecular unit thereof, (ii) a water phase being 90 wt %, preferably 95 wt %, and particularly preferably 97 wt % of the total amount of the emulsion, (iii) a surfactant such as, for example, the sorbitan fatty acid ester or the glycerol monofatty acid ester, and (iv) a polymerization initiator and heating the HIPE till completion of polymerization and cross-linkage.

According to this HIPE method, a reticular porous material comprising continuous cells is formed by reversed-phase emulsion polymerization. The porous material which is obtained by the HIPE method, therefore, possesses a low density and excels in water absorption properties and finds extensive utility in (1) liquid absorbents; such as, for example, core materials for disposable diapers and sanitary napkins, i.e. absorbents for water and excrements like urine and treating agents for waste oil and waste solvent, i.e. absorbents for oils and organic solvents, (2) energy absorbents; such as, for example, sound insulating materials and heat insulating materials in automobiles and buildings, i.e. absorbents for sound and heat, (3) basic materials for impregnation with chemical preparations; such as, for example, toiletries impregnated with aromatic, detergent, polish, surface protecting agent, and flame retardant.

The porous material obtained by polymerizing the HIPE, owing to its outstanding characteristic properties, has been finding uses copiously in building materials and toiletries as well as sanitary articles. These applications have been undergoing improvements directed to imparting complicate shapes and sizes which fit the purposes of use with the object of exalting the consumers' feeling of use.

As a means to manufacture continuously these individual products, the method disclosed in JP-A-10-217, 264 has been available, for example. This patent publication discloses a method for continuously producing an artificial marble slab of acrylic type resin by continuously injecting a polymerizing raw material into an apparatus for continuous hardening composed of a set of endless steel belts and an accessory device, imparting an adjusted thickness to the incoming raw material with a thickness adjusting device, and moving the steel belts nipping the layer of raw material there between in a hardening chamber and meanwhile continuously hardening the layer of raw material thereby yielding a semi-finished product in the shape of a slab.

This method of continuous production is a means to produce a platelike material by giving a uniform thickness to a supplied polymerizing raw material by means of a thickness adjusting device disposed on an endless steel belt and thereafter polymerizing the resultant plate of the raw material.

Since this method of continuous production is directed to yielding a platelike material, the portion of the material expelled by the thickness-adjusting device is elongated in the planar direction. Though this method does not give rise to a surplus material, it incurs difficulty in enabling a plate of material having a prescribed area to acquire a fixed thickness without giving rise to a surplus. The molding of the finished product essentially requires a work of edge trimming subsequently to the step of polymerization.

In the quantity manufacture of porous products, the work of edge trimming performed on the individual products withdrawn from the mold degrades the productivity of the manufacture. When the porous products have a complicated shape, this step of edge trimming has the possibility of determining the rate of the manufacture. Moreover, since the HIPE contains a large quantity of water, the trimming given individually to the water-containing polymers or the trimming given individually to the porous products resulting from the removal of the large quantity of water so contained is fated to impair the workability of the relevant products.

In manufacturing products of a complicated shape, the joining two vertically halved dies are generally practiced. The HIPE, as described above, is the product obtained by adding a water phase and a surfactant to a polymerizing monomer mixture and emulsifying the resultant mixture. It possesses such a property as retains fluidity under shearing stress and, once placed on a movable support, loses the fluidity abruptly owing to the disappearance of the shearing stress. The HIPE, which has been supplied into the mold, therefore, is prevented from being spontaneously extended to all the corners of the mold but is suffered to yield products revealing missing parts. This phenomenon is conspicuous particularly when the molded products have a complicated shape. A plan to join continuously a plurality of molds and supply the HIPE into these molds by the pattern of continuing and discontinuing this supply with the object of efficiently manufacturing porous products is extremely difficult to accomplish.

Further, when the HIPE is continuously supplied into the plurality of molds, the HIPE extracted from the molds possibly require an extra work of edge trimming because the molding flash is formed between the molds. When the HIPE is supplied in an excess amount to the molds and the lids of the molds are utilized for exerting pressure to the HIPE in the molds on account of the very low fluidity manifested by the HIPE supplied into the molds, the portion of the HIPE which overflows the molds is wasted and suffered to incite the occurrence of molding flash.

The present inventors have pursued a detailed study on the process for manufacturing porous products by the HIPE method and have consequently found that the continuous supply of the HIPE to a shaping unit provided with a plurality of continuously joined molds enables the HIPE to be quickly supplied into the interiors of the plurality of molds, that the closure of these molds with lids permits products molded in a complicated shape to be manufactured in a large quantity at once, that the lids adapted to sink under their own weights onto the HIPE held in the molds enables the HIPE to be uniformly distributed within the interiors of the molds, if complicated in shape, and that since the HIPE contains a large quantity of water, the lids tightly fastened to the molds allow individual porous products to be manufactured without entailing occurrence of molding flash. This invention has been perfected as a result.

It is, therefore, an object of this invention to provide a method which, by quickly supplying the HIPE continuously to a shaping unit provided with a plurality of continuously joined molds, attaining manufacture of products molded in a complicated shape in a large quantity at once by closing the molds with lids, adapting the lids to fit closely to the molds and sink under their own weight onto the HIPE thereby ensuring uniform distribution of the HIPE throughout the interiors of the molds in a complicated shape, is enabled to manufacture individual porous products without entailing the occurrence of molding flash.

The present invention which accomplishes this object concerns a method for the manufacture of porous products by supplying a water-in-oil type high internal phase emulsion into molds and polymerizing the HIPE therein till of an expected shape, which method comprises moving at a fixed speed a shaping unit possessed of one mold element having depressed parts formed in a smooth die face and another mold element furnished with a smooth die face adapted to contact the die face mentioned above and a corresponding depressed parts capable of forming stereoscopic cavities together with the depressed parts mentioned above, continuously supplying the emulsion mentioned above into the interiors of the two mold elements mentioned above before the mold elements are joined, joining the two mold elements, then transferring the shaping unit to a polymerizing device, and polymerizing the emulsion in the molds till of an expected shape thereto.

Figure 1:
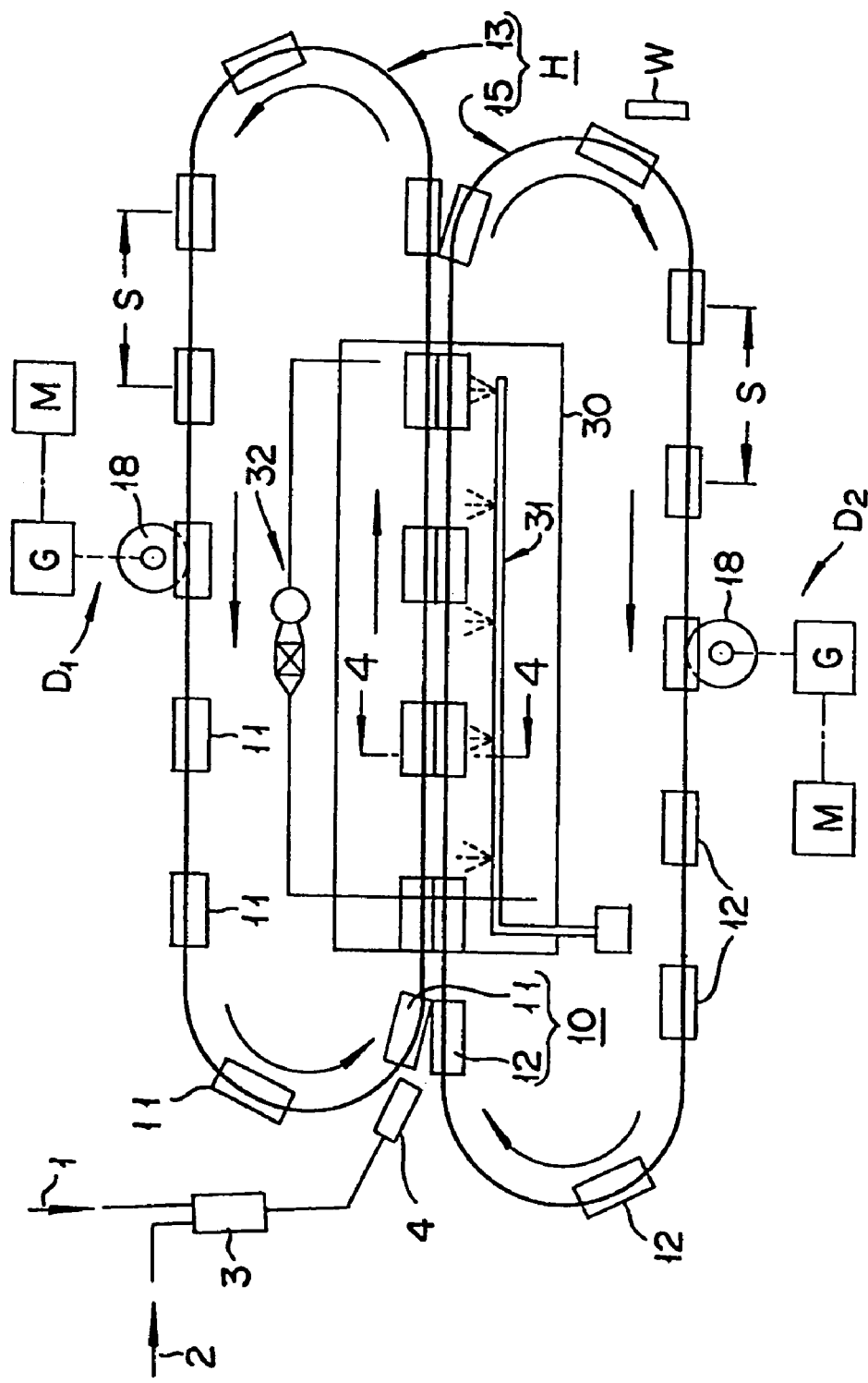
FIG. 1 is a schematic side view illustrating the first preferred embodiment of the method for manufacture of porous products according to this invention.

Now, the method for the manufacture of porous products according to this invention will be described below based on the preferred embodiments.

First, the materials to be used therefore will be described.

[I] Raw Material to be Used for HIPE

The raw material to be used for the HIPE has only to contain (a) a polymerizing monomer, (b) a cross-linking monomer, and (c) a surfactant as essential components for forming an oil phase and to contain (d) water as an essential component for forming a water phase. As occasion demands, it may further contain (e) a polymerization initiator, (f) a salt, and (g) other additives as arbitrary components for forming the oil phase and/or the water phase.

(a) Polymerizing Monomer

The polymerizing monomer mentioned above does not need to be particularly restricted but has only to possess one polymerizing unsaturated group in the molecular unit and to be capable of dispersing or polymerizing in the HIPE, or capable of forming bubbles. It contains preferably at least partly a (meth)acrylic ester, more preferably not less than 20 wt % of the (meth)acrylic ester, and particularly preferably not less than 35 wt % of the (meth)acrylic ester. The inclusion of the (meth)acrylic ester as a polymerizing monomer in the raw material is preferable because it allows formation of a porous material abounding in plasticity and toughness.

As concrete examples of the polymerizing monomer, allylene monomers such as styrene; monoalkylene allylene monomers such as ethyl styrene, α-methyl styrene, vinyl toluene, and vinylethyl benzene; (meth)acrylic esters such as methyl (meth)acrylate, ethyl (meth)acrylate, butyl (meth) acrylate, isobutyl (meth)acrylate, isodecyl (meth)acrylate, 2-ethylhexyl (meth)acrylate, lauryl (meth)acrylate, stearyl (meth)acrylate, cyclohexyl (meth)acrylate, and benzyl (meth)acrylate; chlorine-containing monomers such as vinyl chloride, vinylidne chloride, and chloromethyl styrene; acrylonitrile compounds such as acrylonitrile and methacrylonitrile; and vinyl acetate, vinyl propionate, N-ocetadecyl acrylamide, ethylene, propylene, and butene may be cited. These polymerizing monomers may be used either singly or in the form of a combination of two or more members.

The quantity of the polymerizing monomer to be used is preferred to fall in the range of 10~99.9% by mass based on the total mass of the monomer component formed of the polymerizing monomer and a cross-linking monomer which will be specifically described herein below. The reason for this range is that the porous material is produced with a fine pore diameter. This range is more preferably 30~99% by mass and particularly preferably 30~70% by mass. If the quantity of the polymerizing monomer to be used falls short of 10% by mass, the shortage will possibly suffer the produced porous material to become brittle and reveal deficiency in the ratio of stereoscopic expansion with absorbed water. Conversely, if the quantity of the polymerizing monomer exceeds 99.9% by mass, the excess will possibly induce the produced porous material to reveal deficiency in strength and resilient recovery and to fail to absorb water in a sufficient quantity and secure a sufficient speed of water absorption.

(b) Cross-linking Monomer

The cross-linking monomer does not need to be particularly restricted but has only to possess at least two polymerizing unsaturated groups in the molecular unit and, similarly to the polymerizing monomer mentioned above, to be capable of dispersing or polymerizing in the water-in-oil type high internal phase emulsion.

As concrete examples of the cross-linking monomer, aromatic monomers such as divinyl benzene, trivinyl benzene, divinyl toluene, divinyl xylene, p-ethy-divinyl benzene, divinyl alkyl benzenes, divinyl naphthalene, divnyl phenanthrene, divinyl biphenol, divinyl diphenyl methane, divinyl benzyl, divinyl phenyl ether, and divinyl diphenyl sulfide; oxygen-containing monomers such as divnyl furan; sulfur-containing monomers such as diviyl sulfide and divinyl sulfone; aliphatic monomers such as butadiene, isoprene, and pentadiene; and ester compounds of polyhydric alcohols and acrylic acid or methacrylic acid such as ethylene glycol di(meth)acrylate, diethylene glycol di(meth)acrylate, triethylene glycol di(meth)acrylate, polyethylene glycol di(meth)acrylate, 1,3-butane diol di(meth)acrylate, 1,4-butane diol di(meth)acrylate, 1,6-hexane diol di(meth)acrylate, octane diol di(meth)acrylate, decane diol di(meth)acrylate, trimethylol propane di(meth)acrylate, trimethylol propane tri(meth)acrylate, pentaerythritol di(meth) acrylate, pentaerythritol tri(meth)-acrylate, pentaerythritol tetra(meth)acrylate, dipentaerygthritol di(meth)acrylate, dipentaerythritol tri(meth)acrylate, dipentaerythritol tetra(meth)acrylate, N,N'-methylene bis(meth)acrylamide, triallyl isocyanurate, triallyl amine, tetraalloyloxy ethane, and hydroquinone, catechol, resorcinol, and sorbitol may be cited. These cross-linking monomers may be used either singly or in the form of a combination of two or more members.

The quantity of this cross-linking monomer to be used is preferably in the range of 0.1~90% by mass, more preferably in the range of 1~70% by mass, and particularly preferably in the range of 30~70% by mass based on the total mass of the monomer component formed of the polymerizing monomer and the cross-linking monomer. If the quantity of the cross-linking monomer to be used falls short of 0.1% by mass, the shortage will possibly induce the produced porous material to reveal deficiency in strength and resilient recovery and in capacity for absorption per unit volume or unit mass and fail to absorb water in a sufficient quantity and secure a sufficient speed of water absorption. Conversely, if the quantity of the cross-linking monomer to be used exceeds 90% by mass, the excess will possibly induce the porous material to become brittle or reveal deficiency in the ratio of stereoscopic expansion with absorbed water.

(c) Surfactant

The surfactant mentioned above does not need to be particularly restricted so long as it is capable of emulsifying the water phase in the oil phase in the configuration of the HIPE. It may be properly selected from the nonionic surfactants, cationic surfactants, anionic surfactants, and amphoteric surfactants which have been known to the art.

The nonionic surfactants include nonylphenol polyethylene oxide adduct; block polymer of ethylene oxide and propylene oxide; sorbitan fatty acid esters such as sorbitan monolaurate, sorbitan monomyristirate, sorbitan monopalmitate, sorbitan monostearate, sorbitan tristearate, sorbitan monooleate, sorbitan trioleate, sorbitan sesquioleate, and sorbitan distearate; glycerin fatty acid esters such as glycerol monostearate, glycerol monooleate, diglycerol monooleate, and self-emulsifying glycerol monostearate; polyoxyethylene alkyl ethers such as polyoxyethylene lauryl ether, polyoxyethylene cetyl ether, polyoxyethylene stearyl ether, polyoxyethylene oleyl ether, and polyoxy-ethylene higher alcohol ethers; polyoxyethylene alkylaryl ethers such as polyoxyethylene nonylphenol ether; polyoxyethylene sorbitan fatty acid esters such as polyoxyethylene sor bitan monolaurate, polyoxyethylene sorbitan monolaurate, polyoxyethylene sorbitan monopalmitate, polyoxyethylene sorbitan monostearate, polyoxyethylene sorbitan tristearate, polyoxyethylene soribitan monooleate, and polyoxyethylene sorbitan trioleate; polyoxyethylene sorbitol fatty acid esters such as tetraoleinic acid polyoxyethylene sorbit; polyoxyethylene fatty acid esters such as polyethylene glycol monolaurate, polyethylene glycol monostearate, polyethylene glycol distearate, and polyethylene glycol monooleate; polyoxystyrene alkyl amines, polyoxyethylene-hardened castor oil; and alkylalkanol amides, for example. These nonionic surfactants have a HLB not exceeding 10, preferably a HLB falling in the range of 2~6. These nonionic surfactants may be used in the form of a combination of two or more members. This combined use possibly improves the HIPE in stability.

The cationic surfactants include quaternary ammonium salts such as stearyltrimethyl ammonium chloride, ditallow dimethyl ammonium methyl sulfate, cetyltrimethyl ammonium chloride, distearyldimethyl ammonium chloride, alkylbenzylimethyl ammonium chlorides, and lauryltrimethyl ammonium chloride; alkyl amine salts such as coconut amine acetate and stearyl amine acetate; alkyl betaines such as lauryl betaine, stearyl betaine, and lauryl carboxymethyl hydroxyetnhyl imidazolinium betaine; and amine oxides such as lauryldimethyl amine oxide, for example. The use of such a cationic surfactant possibly imparts an outstanding antibacterial property to the produced porous material when this material is utilized as water absorbent, for example.

The anionic surfactants which are possessed of an anionic moiety and an oil-soluble moiety can be advantageously used. They include alkyl sulfates such as sodium dodecyl sulfaate, potassium dodecyl sulfate, and ammonium alkyl sulfates; sodium dodecylpolyglycol ether sulfate; sodium sulforicinoleate; alkyl sulfonates such as sulfonated paraffin salt; alkyl sulfonates such as sodium dodecylbenzene sulfonate and alkali metal sulfates of alkaliphenol hydroxyethylene; higher alkyl naphthalene sulfonates; fatty acid salts such as naphthalene sulfonic acid formalin condensate, sodium laurate, triethanol amine oleate, and triethanol amine apiate; sulfuric ester of polyoxyalkyl ether; sulfuric esters of polyoxyethylene carboxylic acid; sulfuric esters of polyoxyethylene phenyl ether; sulfonic acid salts of succinic dialkyl esters; and reactive anionic emulsifierfs possessed of a double bond such as polyoxyethylene alkyl aryl sulfates, for example. Such an anionic surfactant may be used in combination with a cationic surfactant with the aim of adjusting the HIPE.

Incidentally, the combined use of a nonionic surfactant and a cationic surfactant possibly improves the HIPE in stability.

The quantity of the surfactant mentioned above to be used is preferably in the range of 1~30 parts by mass, more preferably in the range of 3~15 parts by mass, based on 100 parts by mass of the total mass of the monomer component formed of a polymerizing monomer and a cross-linking monomer. If the quantity of the surfactant to be used falls short of 1 part by mass, the shortage will possibly render the high dispersibility of the HIPE unstable and prevent the surfactant itself from manifesting the function and effect inherent therein. Conversely, if the quantity of the surfactant to be used exceeds 30 parts by mass, the excess will possibly induce the produced porous material to become unduly brittle and prove uneconomical because it fails to bring a proportionate addition to the expected effect.

(d) Water

As the water mentioned above, besides tap water, purified water, and deionized water which are available, the wastewater resulting from the production of the porous material may be used either directly in its unmodified form or after undergoing a prescribed treatment with the aim of promoting the reclamation of waste. This invention contemplates using the water which results from the treatment of the waste water and contains a polymerization initiator in a concentration of not more than 800 ppm. For the purpose of ensuring smooth formation of the HIPE while preventing the phenomenon of gelation from occurring in an emulsifying device, it is preferable to avoid addition of a water-soluble polymerization initiator to the water phase. The reason for avoiding this addition is that the wastewater can be effectively utilized. In this case, the total quantity of the water used herein does not need to rely solely on the water resulting from the treatment of the wastewater for the removal of the polymerization initiator but may rely partly on the treated water. When the plant uses a plurality of production lines for the porous material, the wastewater emanating from one of such production lines may be treated and the treated water may be utilized for the formation of the HIPE in the other production lines.

(e) Polymerization Initiator

The polymerization initiator is used for the purpose of attaining the polymerization of the HIPE very quickly. The polymerization initiator has only to be usable in the reversed-phase emulsion polymerization. It may be either soluble in water or soluble in oil.

As concrete examples of the water-soluble polymerization initiator, azo compounds such as 2,2'-azobis(2-amidinopropane) dihydrochloride; persulfates such as ammonium persulfaate, potassium persulfate, and sodium persulfate; and peroxides such as potassium peracetate, sodium peracetate, potassium percarbonate, sodium percarbonate, and hydrogen peroxide may be cited.

As concrete examples of the oil-soluble polymerization initiator, peroxides such as cumene hydroperoxide, t-butyl hydroperoxide, t-butylperoxy-2-ethylhexanoate, di-t-butyl perxodie, diisopropyl benzene peroxide, p-menthane hydroperoxide, 1,1,3,3-tetramethyl butyl hydroperoxide, 2,5-dimethylhexanone-2,5-dihydroperoxide, benzoyl peroxide, and methylethyl ketone peroxide may be cited.

These polymerization initiators may be used either singly or in the form of a combination of two or more members. It is preferable to use in combination two or more polymerization initiators which have different 10-hour half-life temperatures, i.e. the temperatures at which the concentration is halved in 10 hours. As a matter of fact, a water-soluble polymerization initiator and an oil-soluble polymerization initiator may be used in combination.

The quantity of the polymerization initiator which can be used for the reversed-phase emulsion polymerization mentioned above is preferably in the range of 0.05~25 parts by mass, more preferably in the range of 1.0~10 parts by mass, based on 100 parts by mass of the total mass of the monomer component formed of a polymerizing monomer and a cross-linking monomer, though variable with the combination of the monomer component and the polymerization initiator mentioned above. If the quantity of the polymerization initiator to be used falls short of 0.05 part by mass, the shortage will be at a disadvantage in unduly increasing the unaltered monomer component and consequently adding to the quantity of the residual monomer in the produced porous material. Conversely, if the quantity of the polymerization initiator to be used exceeds 25 parts by mass, the excess will be at a disadvantage in rendering the control of polymerization difficult and inducing the produced porous material to suffer from degradation of mechanical properties.

It is further permissible to use a redox polymerization initiator which is obtained by combining the polymerization initiator mentioned above with a reducing agent. The redox polymerization initiator has a reducing agent exist therein in addition to peroxide. The oxidation-reduction reaction between these two components forms an active free group and initiates polymerization. In this case, the polymerization initiator may be in a water-soluble type or an oil-soluble type. It is permissible to use a water-soluble redox polymerization initiator and an oil-soluble redox polymerization initiator in combination. Specifically, the peroxide mentioned above is used in combination with the following reducing agent.

As concrete examples of the water-soluble reducing agent, sodium hydrogen sulfite, thiosulfuric acid and thiosulfates such as sodium thiosulfate and potassium thiosulfate, dithionous acid and salts thereof, L-ascorbic acid and L-ascorbates such as sodium L-ascorbate, erysorbic acid and erysorbates such as sodium erysorbate, ferrous oxalate, ferrous salts such as ammonium ferrous sulfate, ferrous salts such as ferrous bromide and ferrous chloride, formaldehyde sodium sulfoxylate, glucose, dextrose, triethanol amine, and diethanol amine may be cited. As concrete examples of the oil-soluble reducing agent, organic amine compounds such as aniline, dimethyl aniline, and p-phenylene diamine, tin octilate, and cobalt naphthanate may be cited. These redox polymerization initiator type reducing agents may be used either singly or in the form of a combination of two or more members.

The ratio of the reducing agent (ratio by mass) contained in the redox polymerization initiator mentioned above, i.e. polymerization initiator (oxidizing agent)/reducing agent, is approximately in the range of 1/0.01~1/10, preferably in the range of 1/0.2~1/5.

(f) Salt

The salt mentioned above, when necessary for the purpose of improving the HIPE in stability, may be used.

As concrete examples of the salt, halogenides, sulfates, and nitrates and other water-soluble salts of such alkali metals and alkaline earth metals as calcium chloride, sodium sulfate, sodium chloride, and magnesium sulfate may be cited. These salts may be used either singly or in the form of a combination of two or more members. Such a salt is preferred to be added to the water phase. Polyvalent metal salts prove particularly advantageous from the viewpoint of the stability of the HIPE during the course of polymerization.

The quantity of the salt to be used is preferably in the range of 0.1~20 parts by mass and more preferably in the range of 0.5~10 parts by mass, based on 100 parts by mass of water. If the quantity of the salt to be used exceeds 20 parts by mass, since the waste squeezed out of the HIPE is fated to contain the salt in an unduly large quantity, the excess will increase the cost for the treatment of waste water and prove uneconomical because it brings no proportionate addition to the expected effect of addition. If the quantity of the salt to be used falls short of 0.1 parts by mass, the shortage will possibly prevent the function and effect of the addition of the salt from being manifested fully satisfactorily.

(g) Other Additive

Other various additives may be properly used when the impartation of the performances and functions of their own result in improving the production condition, the characteristic properties of a produced HIPE, and the performance of a porous material. A salt and/or a buffer may be added, for example, for the purpose of adjusting the pH. The quantities of such other additives to be used have only to fall in ranges such that the performances, functions, and economies commensurate with the purposes of addition of their own may be manifested fully satisfactorily. As concrete examples of the additives, activated carbon, inorganic powder, organic powder, metal powder, deodorant, antibacterial mildew proofing agent, perfume, and various macromolecular substances may be cited.

[II] Formation of HIPE

As a means to form the HIPE, a method selected from among the heretofore known methods for the formation of the HIPE may be properly utilized. Now, a typical method for the preparation of the HIPE will be specifically described below.

(a) Apparatus for Production of HIPE

The apparatus for the formation of the HIPE does not need to be particularly restricted but may be selected from among the heretofore known apparatuses for the production of the HIPE. As the stirring device (emulsifying device) to be used for stirring a water phase and an oil phase till mixture, a known stirring device or kneading device may be adopted. As concrete examples of the stirring device, stirring devices possessed of such a pinnate member as a propeller, a paddle, or a turbine, homomixers, line mixers, and pin mills may be cited. Any of such stirring devices will suffice.

(b) Mixing of HIPE Materials

Generally, a homogeneous oil phase is prepared by stirring at a prescribed temperature at least a polymerizing monomer, a cross-linking monomer, and a surfactant, i.e. the components for the formation of an oil phase and an emulsifying device is charged with this oil phase. Separately, a homogeneous water phase is prepared by combining and stirring water and an optionally added salt, i.e. the components for the formation of an oil phase and heating the resultant mixture at a prescribed temperature in the range of 30~90° C. The emulsifying device is charged with this water phase. The HIPE can be stably formed by stirring the two phases till mixture at a prescribed temperature which will be specifically described herein below and exerting a moderate shear force on the produced mixture till emulsification. The water phase and the oil phase for use in the formation of the HIPE may incorporate therein other components as occasion demands.

When the wastewater is used at all, it ought to be such that the polymerization initiator contained therein may account for a concentration of not more than 800 ppm. For the purpose of preventing the interior of the emulsifying device from inducing the phenomenon of gelation and ensuring formation of the HIPE smoothly, the water phase prefers to avoid incorporation therein of a water-soluble polymerization initiator. By the same token, the oil phase prefers to avoid incorporation therein of an oil-soluble polymerization initiator.

(c) Temperature for Formation of HIPE

The temperature for the formation of the HIPE (hereinafter referred to occasionally as "emulsifying temperature") is in the range of 70~110° C. and preferably in the range of 80~110° C., If the temperature for the formation of the HIPE falls short of 70° C., the shortage will open the possibility of requiring the heating to continue for an unduly long time, depending on the curing temperature. Conversely, if the temperature exceeds 110° C., the excess will open the possibility of degrading the stability of the formed HIPE. Incidentally, the term "emulsifying temperature" as used in the present specification refers to the temperature of the HIPE which exists when the HIPE begins to polymerize in consequence of the addition of the polymerization initiator. During the preparation of the HIPE, therefore, the temperatures of the water phase and the oil phase do not need to remain constantly in the range of 70~110° C. It is, therefore, permissible to adjust the temperatures of the oil phase and/or the water phase in advance to the prescribed emulsifying temperature, then stir and mix the two phases till emulsification, and finally form the HIPE in the range of temperature mentioned above.

(d) Water Phase/Oil Phase (W/O) Ratio

The water phase/oil phase (W/O) ratio in the HIPE obtained as described above can be properly selected, depending on the purpose for which the porous material possessed of open cells is used (such as, for example, water absorbent, oil absorbent, sound absorbent, and filter) and has only to exceed 3/1 as defined previously. This ratio is preferably in the range of 10/1~250/1 and particularly preferably in the range of 10/1~100/1. If the W/O ratio falls short of 3/1, the shortage will compel the porous material to reveal deficiency in the ability to absorb water and energy and to suffer an unduly low aperture and will open the possibility of the produced porous material revealing deficiency in the surface aperture and failing to acquire a fully satisfactory ability to pass liquid. By varying the W/O ratio, however, it is made possible to decide the void ratio of the porous material. It is, therefore, preferable to select the W/O ratio so that the void ratio may conform to the purpose of use. When the porous material is used as a varying absorbent material for disposable diapers and sanitary articles, for example, the W/O ratio is preferred to fall approximately in the range of 10/1~100/1. Incidentally, the HIPE which is obtained by stirring and mixing the water phase and the oil phase is generally a white highly viscous emulsion.

[III] Manufacture of Porous Product (a) Addition of Polymerization Initiator

The HIPE begins to polymerize in consequence of the addition of a polymerization initiator to the HIPE at a temperature of not lower than 70° C. It is preferable from the viewpoint of the stability of the HIPE first to form the HIPE at the prescribed temperature and then add thereto the polymerization initiator.

The polymerization initiator occasionally use an oxidizing agent and a reducing agent as in the case of a redox type initiator. In this case, the polymerization is particularly promoted after the two agents have been mixed. Thus, the expression "addition of polymerization initiator" as used in the present specification refers, when the polymerization initiator uses two or more compounds in combination, to the addition of the plurality of polymerization initiators mentioned above. When the redox polymerization initiator is used as the polymerization initiator, it is preferable to form the HIPE by adding a reducing agent in advance to the oil phase and/or the water phase, adjusts the HIPE to the prescribed temperature, and thereafter adds peroxide thereto.

The porous material can be continuously produced quickly by heightening the emulsifying temperature and the polymerizing temperature. When the emulsifying temperature is high, the polymerization is started immediately by the addition of the polymerization initiator. In this invention, therefore, it is preferable to provide the flow path leading from the emulsifying device for forming the HIPE to the mold element or the polymerizing device with a port for the introduction of a reducing agent or an oxidizing agent or other polymerization initiator, add such a polymerization initiator to the HIPE via the port, and mix the HIPE and the polymerization initiator with a line mixer. This arrangement can prevent the interior of the emulsifying device to induce gelation. In this case, the kind of the polymerization initiator to be added to the HIPE is irrelevant. Besides the case of adding the oil-soluble or water-soluble polymerization initiator via this port, the method which comprises adding a peroxide during the formation of the HIPE and thereafter adding the water-soluble reducing agent through the flow path leading from the emulsifying device to the polymerizing device is effective, depending on the kind of the polymerization initiator to be used. The combination of sodium persulfate and L-ascorbic acid is one example.

The polymerization initiator can be used in an undiluted form or in the form of a solution or dispersion in an organic solvent. The addition of the polymerization initiator or the redox type polymerization initiator to the HIPE can be attained efficiently by having this polymerization initiator dissolved in advance in an oil-soluble solvent when the reducing agent in the polymerization initiator is soluble in oil or in a water-soluble solvent when the reducing agent is soluble in water.

(b) Method for Manufacture of Porous Product

Since the HIPE is devoid of fluidity when it is not placed under shearing stress, it is difficult to have the HIPE supplied individually to a plurality of mold elements. By having the HIPE supplied to a shaping unit which is formed of a plurality of continuously connected mold elements, however, it is made possible to expedite the supply of the HIPE.

Further, by stoppering the shaping unit thereby allowing the HIPE to be formed individually in varied expected shapes, it is made possible to manufacture efficiently even products of complicated stereoscopic shapes.

From this point of view, this invention adopts the following method for the manufacture of porous products.

<Mode 1 of Embodiment>

The mode 1 of embodiment of the method for manufacture of porous products according to this invention will be described below with reference to FIGS. 1~4.

This mode 1, as illustrated in FIG. 1, comprises introducing an oil phase 1 and a water phase 2 into an emulsifying device 3 and forming an HIPE therein and supplying the formed HIPE from an HIPE supplying part 4 toward a shaping unit 10.

The shaping unit 10 is composed of a plurality of mold elements 11 disposed on one side and a plurality of mold elements 12 on the other side. These mold elements 11 and 12 are disposed continuously in the direction of supply and are conveyed by a conveying member H.

The conveying member H is composed of a pair of upper endless members 13 and a pair of lower endless members 15. The mold elements 11 on one side are disposed between the one pair of upper endless members 13 and the mold elements 12 of the other side are disposed between the other pair of lower endless members 15 and these mold elements 11 and 13 are spaced with a prescribed distance S. Incidentally, in the present mode of embodiment, the mold elements 11, 12 each total 13.

The upper endless members 13 are driven counterclockwise and the lower endless members 15 are driven clockwise respectively by drive parts D1 and D2 so as to bring these upper and lower mold elements 11, 12 sequentially and correspondingly into contact.

Figure 2:
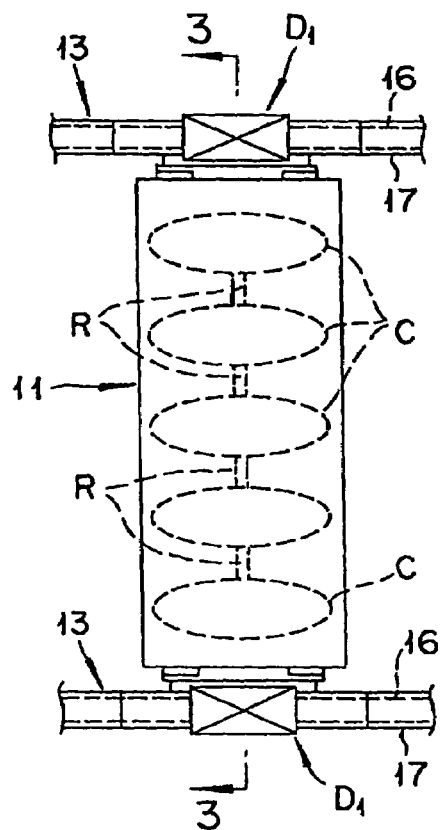
FIG. 2 is a plan view of the essential part of FIG. 1
Figure 3:
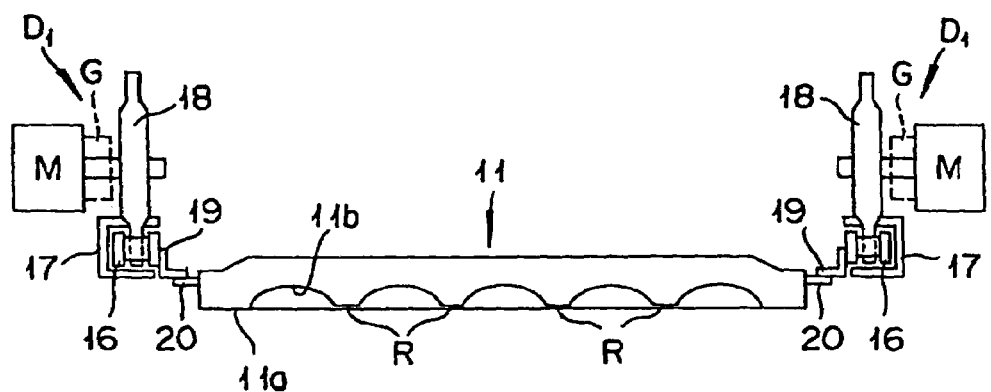
FIG. 3 is a cross section taken across FIG. 2 along the line 3—3.

The endless members 13, 15, as illustrated in FIG. 2, are each formed of a chain 16 and a chain rail 17 supporting the chain 16 and are driven at a fixed speed (such as, for example, approximately 20 cm/min) respectively by driving parts D1, D2. The driving part D1 or D2, as illustrated in FIG. 3, is formed of a sprocket 18 disposed as meshed at proper points with the chain 16 and a motor M joined to the sprocket 18 through the medium of a reduction gearing G. The mold elements 11 or 12 are translated at a fixed speed by synchronously rotating the laterally opposed sprockets 18. The driving parts D1 and D2 of the endless members 13 and 15 also are synchronously driven to bring the mold elements 11 and 12 into contact infallibly. Incidentally, the chain 16 and the mold elements 11 and 12 are connected through the medium of an L-shaped bracket 19 on the chain side and a terminal brackets 20 on the mold element side. It is provided, however, that the endless member 13 or 16 does not need to be limited to the combination of the chain 16 and the sprocket 18 but may be formed of a belt and a roller instead.

Prior to the union of the mold elements 11 and 12 on the opposite sides mentioned above, the shaping unit 10 is supplied with a proper quantity of the HIPE from the HIPE supplying part 4 and the HIPE is shaped in consequence of the union of the mold elements 11, 12 on the opposite sides.

Figure 4:
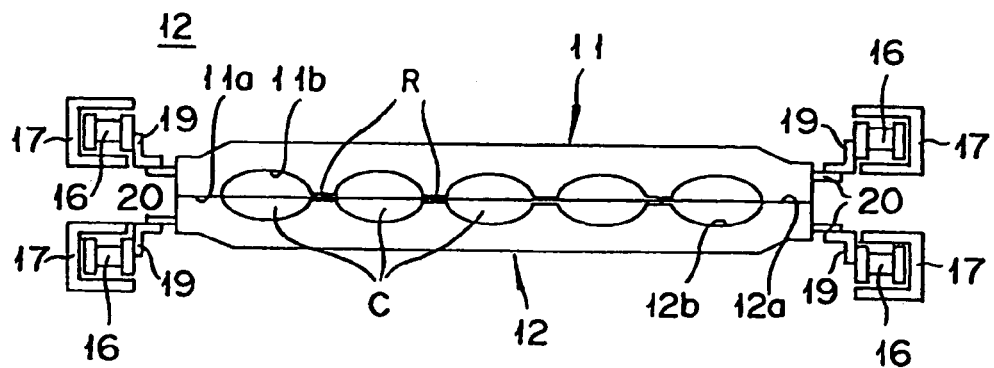
FIG. 4 is a cross section taken across FIG. 1 along the line 4—4.

The mold elements 11 on one side, as illustrated in FIG. 4, each have a plurality of depressed parts 11b formed in a smooth die face 11a and the mold elements 12 on the other side each have a smooth die face 12a adapted to contact the smooth die face 11a mentioned above and have a plurality of corresponding depressed parts 12b formed so as to give rise to prescribed stereoscopic shapes, namely cavities c of a three-dimensional shape, in tandem with the depressed parts 11b mentioned above. Incidentally, in the present mode of embodiment, the number of such cavities c to which the HIPE can be cast at once is set at 5.

Incidentally, the corresponding depressed parts 12b mentioned above are such parts as form the cavities c of a stereoscopic shape in conjunction with the depressed parts 11b mentioned above. They may optionally give rise to the cavities c of the stereoscopic shape by entering into the depressed parts 11b mentioned above. Alternatively, protruding parts may be formed partly on the depressed parts 11b mentioned above so that the formation of the cavities c of the stereoscopic shape may be attained by causing these protruding parts to enter into the corresponding depressed parts 12b.

In the present mode of embodiment, since the adjacent cavities c are made to communicate with each other through the medium of a runner part R, the HIPE supplied to the depressed parts 12b in the mold elements on the other side is depressed in the plurality of cavities c in consequence of the union of the mold elements 11 and 12 on the opposite sides, moved fluently between the adjacent cavities c through the relevant runner parts R, and supplied quickly to all the cavities c, no matter whether the HIPE may not be easily supplied spontaneously. Furthermore, since the HIPE supplied in a prescribed quantity is sealed by the tight adhesion of the smooth die faces 11a, 12a respectively of the mold elements 11,12 and since the HIPE contains water in a large quantity, the tight adhesion of the mold elements 12 serving as lids to the mold elements 11 will prevent otherwise inevitable occurrence of molding flash.

The shaping unit 10, after the HIPE has been injected therein and the mold elements 11 and 12 on the opposite dies have been joined, is conveyed into a polymerizing device 30. This polymerizing device 30 serves the purpose of polymerizing the HIPE by heating the shaping unit 10 and measures about 5 m in length in the axial direction. As illustrated in FIG. 1, it comprises a hot water type temperature elevating portion 31 for spouting a hot water shower from the lower parts of the mold elements 22, 12 on the opposite sides which are joined by the endless members 13, 15 and a hot air type temperature elevating portion 32 for spouting and circulating hot air from the upper parts of the endless members 13 or 15. These temperature elevating portions 31, 32 heat the mold elements 11 and 12 and polymerize the HIPE. The temperature elevating portion 31 and 32 do not always need to be provided together and the use of either of them alone may suffice at times. It is permissible to use a hot air circulating furnace or a water tank such as a constant temperature bath instead.

The mold elements 11 and 12, on departing from the polymerizing device 30, are relieved of their state of union in consequence of the separation of the endless members 13 and 15, with the result that shaped porous products W held in the mold elements will be discharged under their own weight or by a suitable extracting means. Since a total of five shaped porous products W are collectively withdrawn from the relevant mold elements, they enjoy highly satisfactory ease of handling because they can be handled similarly collectively at the subsequent step for treatment.

The mold elements 11 and 12, which have been relieved of the state of union, are returned by the endless members 13 and 15 to their home positions and put to circulation.

Incidentally, the polymerizing device 30 by nature requires a length commensurate with the polymerizing time. In this invention, since the HIPE is capable of effectively undergoing preliminary polymerization and, therefore, allowing a cut of the time of polymerization, the polymerization line is prevented from unduly gaining in length and volume and the polymerizing device can be configured compactly. Naturally, it is permissible to use a so-called batch type polymerizing column or batch type polymerizing device.

<Mode 2 of Embodiment>

The present mode 2 of embodiment contemplates stoppering the mold element 11 on one side with the mold element 12 on the other side, while the mode 1 of embodiment has been described as attaining the union of the mold elements 11 and 12 with paired endless members 13 and 15.

The mode 2 of embodiment shares with the preceding mode 1 of embodiment the process of introducing an oil phase 1 and a water phase 2 into an emulsifying device 3, forming an HIPE therein, and supplying the formed HIPE from an HIPE supplying part 4 toward a shaping unit 10.

Figure 5:
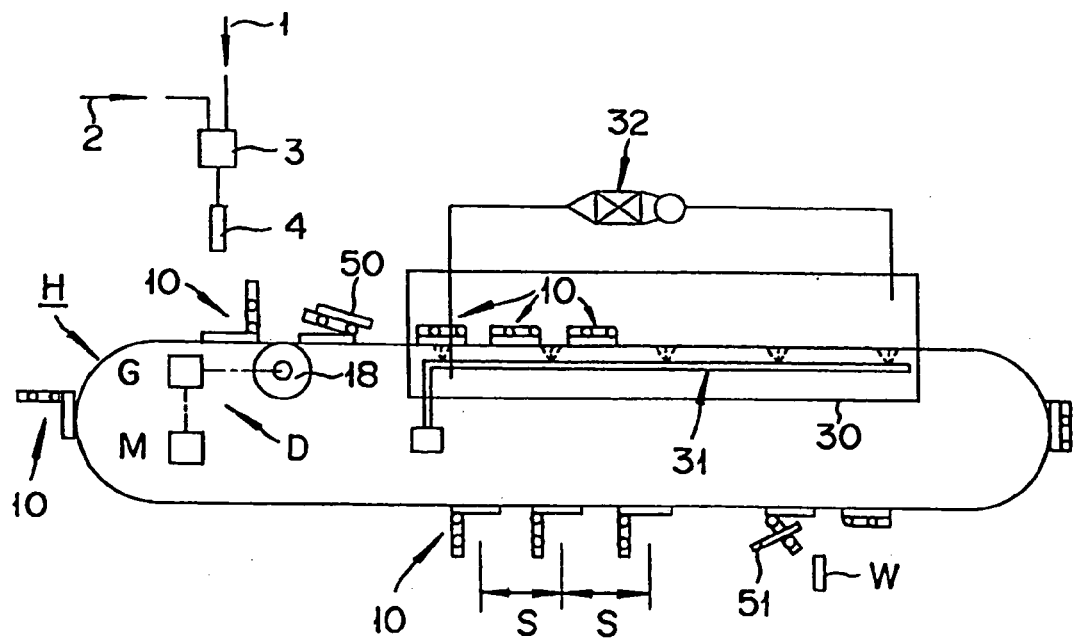
FIG. 5 is a schematic side view illustrating the second preferred embodiment of the method for manufacture mentioned above.

In the present mode 2, the shaping units 10, as illustrated in FIG. 5, are continuously disposed as spaced with a prescribed distance S throughout the entire length of a conveying device H formed of endless members. The shaping units 10, as illustrated in FIG. 7, are each so mounted that the mold element 11 on one side may be stoppered with the mold element 12 on the other side.

The description follows in further details. The conveying device H is formed of a pair of circular chains 16 opposed across a prescribed distance and chain rails 17 severally supporting the chains 16. The chains 16 are moved clockwise at a fixed speed (such as, for example, about 20 cm/min) by a driving part D (refer to FIG. 5). The driving part D is formed of sprockets 18 meshed with the chains 16 and a motor M connected to the sprockets 18 through the reduction gearing G and enabled to impart synchronous rotation to the two chains 16.

Figure 7:
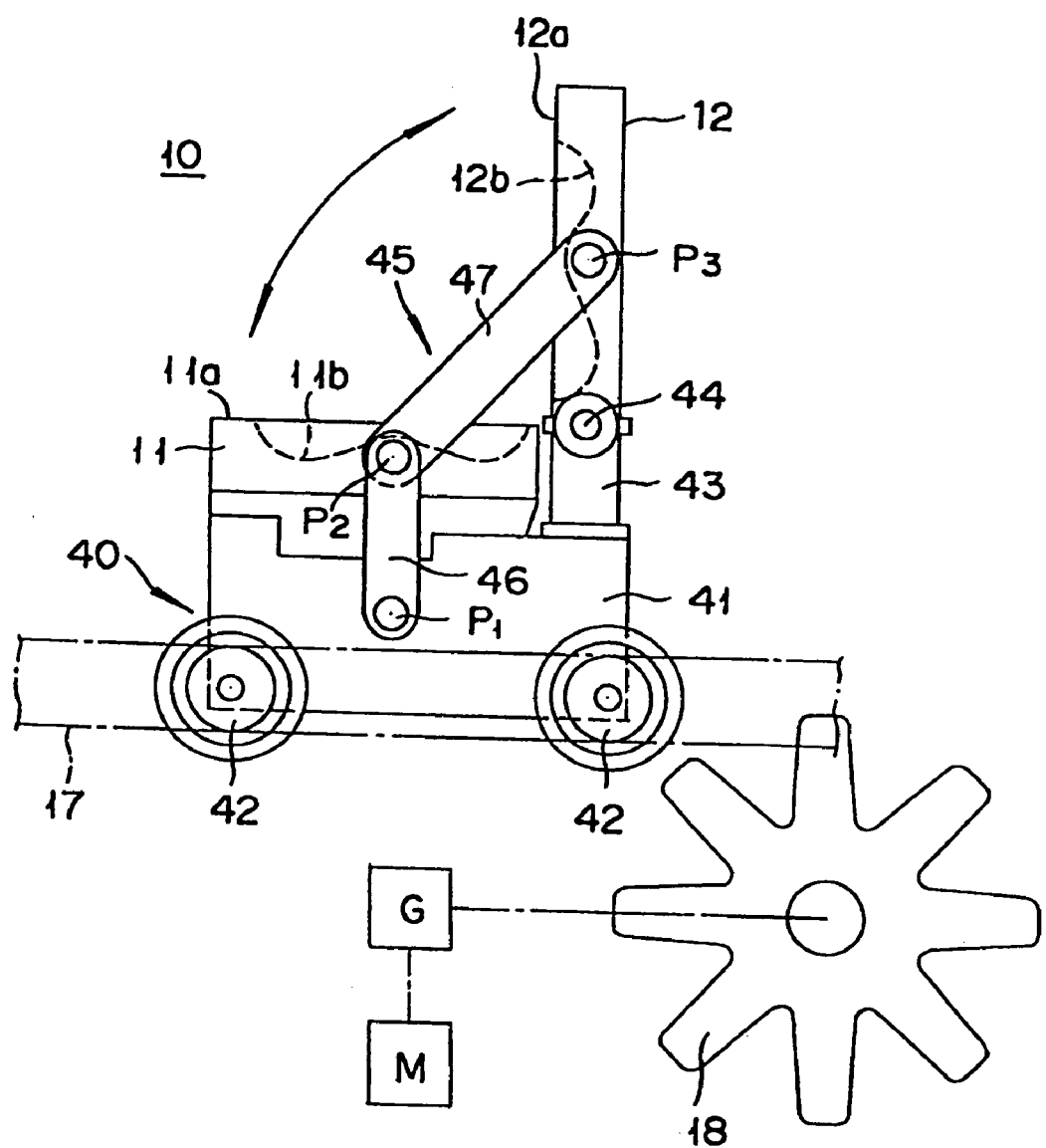
FIG. 7 is a side view of a shaping unit

The shaping units 10, as illustrated in FIG. 7, each has mold elements 11, 12 mounted on a carriage 40 that travels on the chain rails 17. In the carriage 40, a base 41 is provided in the lower part thereof with wheels 42 adapted to travel on the chain rails 17 and disposed as opposed longitudinally and laterally and is provided thereon with mold elements 11 set in position by virtue of convexo-concave fitting and supporting plates 43 disposed as juxtaposed to the mold elements 11. The mold elements 12 on the other side are attached to the supporting plates 43 through hinge parts 44. The mold elements 12 on the other side, therefore, gravitationally produce an opening rotation, namely function as lids, relative to the mold elements 11 on one side. The opening rotation of the mold elements 12 on the other side, however, is restrained by link mechanisms 45. The mold elements 12 on the other side which function as lids rely on the link mechanism 45 not exclusively in gravitationally producing an opening rotation. The link mechanisms 45, as occasion demands, may have connected thereto pneumatically or hydraulically operated fluid pressure operating device or resiliently operated spring device (both not illustrated). In this arrangement, the mold elements 12 on the other side can be forcibly opened and closed and consequently enabled to produce a closing motion as lids more infallibly.

The link mechanisms 45 comprises a first link 46 and a second link 47 which keep the angle of the opening rotation produced by the mold elements 12 on the other side from greatly exceeding the angle of about 90 degrees. These links 46 and 47 are interposed between the base 41 and the mold elements 12 on the other side and are connected with pins P1~P3.

It is provided, however, that the links 46 and 47 are given such lengths that the first link 46 may assume a position parallel to the mold elements 12 on the other side when the mold elements 12 on the other side have produced an angle of rotation of about 90 degrees relative to the mold elements 11 on one side. These lengths are necessary for the purpose of enabling the mold elements 12 on the other side to retain their erect positions including an angle of about 90 degrees for a certain duration.

Figure 6:
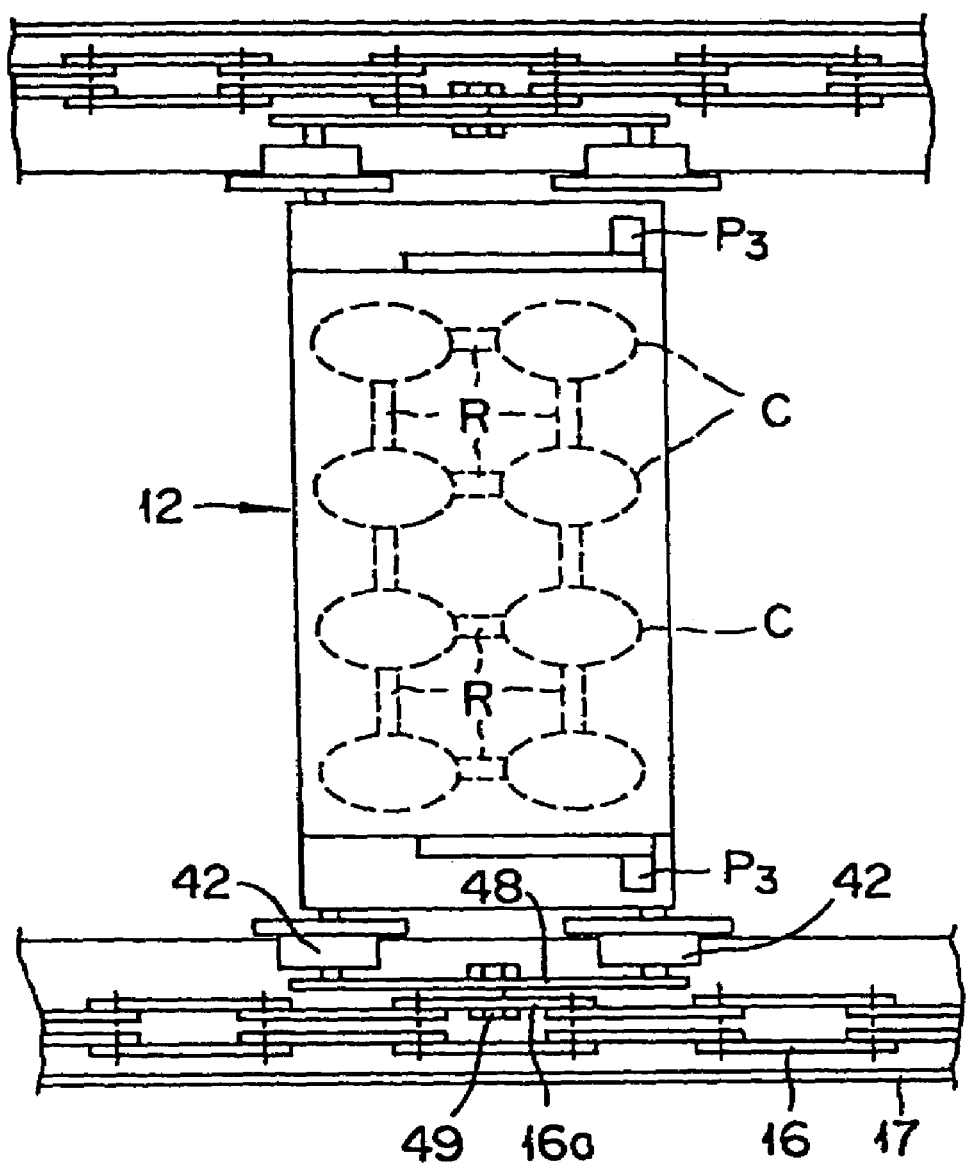
FIG. 6 is a plan view of the essential part of FIG. 5.

The carriage 40, as illustrated in FIG. 6, connects a coupling plate 48 attached to the axles of the front and rear wheels 42 to one of the pieces 16a forming the chain 16 with a screw member 49 or a pin, transmits the driving force of the chains 16 to the carriage 40, and advances the carriage 40 along the chain rails 17. Incidentally, for the purpose of simplifying the construction, the carriage 40 may be directly connected to the chains 16.

The shaping unit 10 conveyed by the carriage 40 is provided on the forward side thereof in the direction of travel of the carriage 40 with the mold elements 13 on the other side which have the hinge parts connected to the supporting plate 43 mentioned above. Owing to this arrangement, the shaping unit 10 can be easily retained in the opened state by the hindered contraction of the first link 46 mentioned above and the HIPE can be smoothly supplied from the HIPE supplying part 4 when the left terminal side in the bearings of FIG. 5, namely the chain 16, is moved from the lower to the upper part.

The mold elements 12 on the other side are supplied with the HIPE emanating from the HIPE supplying part 4 mentioned above while they are being conveyed in the opened state. They are sealed in consequence of the collision of the mold elements 12 on the other side against a mold opening member 50 disposed in the path of conveyance.

Particularly, the mold elements 12 on the other side in the present mode 2 of embodiment rotate relative to the mold elements 11 on one side and function as lids for pressing and sealing the emulsion held therein under their own weight. After the mold elements 11, 12 on the opposite sides are joined, therefore, the mold elements 12 on the other side are caused by their own weight to apply pressure to and sink into the emulsion on the mold elements 11 on one side and impart a shape to the emulsion. Consequently, the HIPE can be uniformly distributed throughout even in the cavities c of a complicated shape and products of all conceivable shapes can be efficiently manufactured. Moreover, since the HIPE contains a large quantity of water, the close attachment of the mold elements 12 as lids to the mold elements 11 precludes the occurrence of a molding flash.

The shaping unit 10 in the closed state is forwarded to the polymerizing device 30 and, similarly to the mode 1 of embodiment mentioned above, the HIPE held in the unit is polymerized by application of heat.

To the shaping unit 10 which has emanated from the polymerizing device 30, the mold opening member 51 meshed with pins P3 disposed on the lateral parts of the mold elements 12 on the other side imparts an initial force to produce a rotation relative to the mold elements 11 on one side. This rotation in combination with the action of gravity opens the shaping unit 10 and allows eight shaped porous products W to fall down all at once from the interior thereof.

The preceding two modes of embodiment have been described as disposing on the conveying member H the shaping unit 10 formed of a single mold element and furnished with a plurality of continuously formed cavities C, moving the shaping unit 10 at a fixed speed, and supplying it with the HIPE. Besides this configuration, the shaping unit 10 may be mounted on the conveying member H furnished with a plurality of continuously disposed mold elements, continuously formed throughout the entire length of the conveying member H, or adapted so as to allow a plurality of mold elements formed continuously thereon.

In the preceding two modes of embodiment, at least either of the mold elements 11 and 12 may be made of at least one material selected from the group consisting of fluorocarbon resin and silicone resin; polyimide, polyphenylene sulfide, polysulfone, polyether sulfone, polyether imide, and polyether ether ketone; polybutylene terephthalate, polyethylene naphthalate, polybutylene naphthalate, and polycyclohexane terephthalate; and stainless steel or may be coated with at least one of such materials.

(c) Method for Polymerization

Supplying the HIPE to the polymerizing device 30 mentioned above and heating it therein effect the polymerization of the HIPE. The end point of this polymerization is announced when the rate of polymerization of the relevant monomer reaches a level of not less than 95%.

Properly, the HIPE is heated at a temperature in the range of normal room temperature ~150° C. From the viewpoint of the stability of the HIPE and the speed of this polymerization, the temperature is preferably in the range of 70~150° C., more preferably in the range of 80~130° C., and particularly preferably in the range of 90~110° C. If the temperature of polymerization falls short of the normal room temperature, the shortage will be at a disadvantage in demanding an unduly long time for the polymerization and possibly exerting an adverse effect on commercial production. Conversely, if the temperature of polymerization exceeds 150oC, the excess will be at a disadvantage in depriving the produced porous material of the uniformity of pore diameter or degrading the strength of the porous material. The temperature of polymerization may be altered at two stages or at more stages during the course of polymerization. The present invention does not exclude this manner of performing the polymerization.

The duration of the polymerization of the HIPE is in the range of one minute ~20 hours. It is preferably within one hour, more preferably within 30 minutes, and particularly preferably in the range of 1~20 minutes. If the duration of polymerization exceeds 20 hours, the excess will be at a disadvantage in degrading the productivity and proving commercially unfavorable. Particularly, since the polymerization is carried out after the step for shaping, the efficiency of the polymerizing device after the step for shaping can be promoted and the length of the polymerizing device 30 can be decreased by curtailing the duration of polymerization. If the duration of polymerization falls short of one minute, the shortage will possibly prevent the porous material from acquiring fully satisfactory strength. Of course, the present invention does not exclude the adoption of a longer duration of polymerization than the duration mentioned above. After the polymerization, the produced polymer is cooled or slowly cooled to a temperature, which is not particularly defined. The porous material resulting from the polymerization may be transferred, without being cooled, to the step for such after-treatment as dehydration or compression that will be described more specifically below.

The term "duration of polymerization" as used herein refers to the time that elapses before the rate of polymerization of the water-in-oil type emulsion reaches 95%. This duration does not need to be particularly restricted. If the duration of polymerization exceeds one hour, the excess will be at a disadvantage in possibly degrading the productivity and proving commercially unfavorable. If this duration falls short of one minute, the shortage will be at a disadvantage in preventing the porous cross-linking monomer material from acquiring a fully satisfactory strength. Of course, the present invention does not exclude the adoption of a longer duration of polymerization than the duration mentioned above.

[IV] Process for After-treatment (Reduction to Finished Product) Subsequent to the Formation of a Porous Product (a) Dehydration of Porous Product The porous product W formed in consequence of the completion of polymerization, when necessary, is subjected to the process for dehydration. This dehydration is effected by compression, suction under reduced pressure, or the combination thereof. Generally, the dehydration thus performed expels 50~98% by mass of the water used. The balance of the water remains as attached to the porous material.

The ratio of dehydration of the shaped porous product is properly set, depending on the use to be found for the porous material. Generally, it may be set so that the water content of the dehydrated product may be in the range of 1~ 10 g, and preferably in the range of 1~5 g, per g of the porous product in the completely dried state.

The wastewater, which is obtained in the process for dehydration, may be reused for the formation of the HIPE. Besides, the water that has been used for forming the water phase of the HIPE and the water that has generated during the drying of the porous product may be used as wastewater.

(b) Compression

The porous product of this invention can be compressed to one of several parts of the original thickness. The compressed porous product has a small volume as compared with the original porous product and permits a reduction in the cost of transportation and storage. The porous product in the compressed shape is disposed, on contacting a large quantity of water, to revert to the original thickness by absorbing the water. The speed of this water absorption is characterized by becoming faster than that of the product in the original thickness. From the viewpoint of saving the spaces for transportation and storage and ensuring ease of handling, the compression to not more than ½ of the original thickness proves efficient. More preferably, this compression is made to not more than ¼ of the original thickness.

(c) Washing

The porous material may be washed with purified water, an aqueous solution containing an arbitrary additive, or a solvent for the purpose of improving the surface condition of the porous material.

(d) Drying

The porous material that is obtained in consequence of the preceding steps, when necessary, may be thermally dried with hot air or a microwave. It may be humidified to adjust the content.

(e) Cutting

The porous product obtained in consequence of the preceding steps may be cut to remove the interconnecting part generated by the runner part R and, when necessary, may be cut in expected shape and size by way of fabrication into a finished product suitable for a varying use.

(f) Impregnation

The porous material may be impregnated with such additives as detergent, aromatic, deodorizer, and antibacterial agent so as to be endowed with functionality.

The preferred embodiments described above are intended for solely illustrating the present invention. The present invention does not need to be limited to these examples but may be variously modified within the scope of claim for patent.

What is claimed is:

1. A method for manufacturing porous products by supplying a water-in-oil type high internal phase emulsion into mold elements in a horizontal state and polymerizing and shaping said emulsion therein, which comprises moving at a fixed speed a shaping unit provided with a lower mold element on one side having a depressed part formed in a smooth mold face and an upper mold element on the other side possessed of a smooth mold face contacting said mold face of the lower mold element and furnished with a corresponding depressed part forming a cavity of a stereoscopic shape together with said depressed part of the lower mold element, such that the upper mold element and lower mold element are vertically opposed, and said upper mold element functions as a lid for said lower mold element, so adapted as to sink under its own weight after it has stoppered the lower mold element to impart a shape to the emulsion supplied in advance into said mold element, in the meanwhile and prior to the union of said two mold elements continuously supplying said emulsion into said two mold elements, transferring said shaping unit into a polymerizing device subsequently to the union of said mold elements, and shaping and polymerizing said emulsion therein.

2. A method according to claim 1, wherein said shaping unit is provided with a plurality of depressed parts continuously formed in the mold face of said mold element on one side and a plurality of corresponding depressed parts continuously formed in the mold face of said mold element on the other side so as to form a multiplicity of cavities therein.

3. A method according to claim 1, wherein said mold elements adapt said plural formed cavities to communicate with each other in each occurrence of adjacency through the medium of a runner part.

4. A method according to claim 1, wherein said shaping unit adapts said mold elements on both sides disposed continuously in the direction of conveyance to be conveyed by respective conveying members.

5. A method according to claim 4, wherein said conveying members are each composed of vertically opposed endless members.

6. A method according to claim 4, wherein said shaping unit adapts said mold elements each having a multiplicity of cavities formed therein to be attached plural to said conveying members and moved thereby at a fixed speed.

7. A method according to claim 1, wherein said shaping unit supplies said emulsion to said mold elements each having a multiplicity of cavities formed therein, transfers said mold elements in the mutually joined state to said polymerizing device, shapes and polymerizes said emulsion, thereafter releases said mold elements, and returns said mold elements to the home positions and puts them to circulation.

8. A method according to claim 5, wherein said shaping unit is continuously disposed throughout the entire length of said endless member.

9. A method according to claim 1, wherein at least either of said mold elements is made of at least one material selected from the group consisting of fluorocarbon resin and silicone resin; polyimide, polyphenylene sulfide, polysulfone, polyether sulfone, polyether imide, and polyether ether ketone; polybutylene terephthalate, polyethylene naphthalate, polybutylene naphthalate, and polycyclohexane terephthalate; and stainless steel or coated with at least one of said materials.

* * * * *